(12) United States Patent
Grebing (10) Patent No.: US 11,529,637 B2
(45) Date of Patent: Dec. 20, 2022

(54) CYCLONE PRE-SEPARATOR AND ARRANGEMENT

(71) Applicant: FESTOOL GMBH, Wendlingen (DE)

(72) Inventor: Gerhard Grebing, Nurtingen (DE)

(73) Assignee: Festool GmbH, Wendlingen (DE)

( * ) Notice: Subject to any disclaimer, the term of this patent is extended or adjusted under 35 U.S.C. 154(b) by 477 days.

(21) Appl. No.: 16/497,461

(22) PCT Filed: Apr. 11, 2017

(86) PCT No.: PCT/EP2017/058693
§ 371 (c)(1),
(2) Date: Sep. 25, 2019

(87) PCT Pub. No.: WO2018/188736
PCT Pub. Date: Oct. 18, 2018

(65) Prior Publication Data
US 2020/0023383 A1    Jan. 23, 2020

(51) Int. Cl.
| | | |
|---|---|---|
| *B01D 9/00* | (2006.01) |
| *B04C 5/185* | (2006.01) |
| *A47L 7/00* | (2006.01) |
| *A47L 9/16* | (2006.01) |
| *B23Q 11/00* | (2006.01) |

(52) U.S. Cl.
CPC ............ *B04C 5/185* (2013.01); *A47L 7/0095* (2013.01); *A47L 9/1691* (2013.01); *B23Q 11/0046* (2013.01); *B23Q 11/0071* (2013.01)

(58) Field of Classification Search
CPC ...... B04C 5/185; A47L 7/0095; A47L 9/1691; B23Q 11/0046; B23Q 11/0071
See application file for complete search history.

(56) References Cited

U.S. PATENT DOCUMENTS

| D213,639 | S | * | 3/1969 | Taylors | ............... | D32/21 |
| 4,934,017 | A | | 6/1990 | Kent | | |
| D343,706 | S | * | 1/1994 | Gurstein | ............ | D32/22 |

(Continued)

FOREIGN PATENT DOCUMENTS

| EP | 2829209 A2 | 1/2015 |
| WO | 9835602 A1 | 8/1998 |
| WO | 2008146952 A1 | 12/2008 |

OTHER PUBLICATIONS

International Search Report in corresponding PCT/EP2017/058693, dated Jan. 9, 2018.
(Continued)

*Primary Examiner* — Dung H Bui
(74) *Attorney, Agent, or Firm* — Hamre, Schumann, Mueller & Larson, P.C.

(57) ABSTRACT

A cyclone pre-separator for positioning on a particle collecting container, the cyclone pre-separator including a box-shaped housing and a cyclone unit arranged in the housing, the cyclone unit including an air inlet, an air outlet, and a particle outlet arranged on an underside of the cyclone pre-separator, where the housing has an air inlet hose port connected to the air inlet and an air outlet hose port connected to the air outlet, and has lower housing couplers, adapted to provide a releasable, vertically tension-proof coupling to the particle collecting container, when the cyclone pre-separator is positioned on the particle collecting container.

18 Claims, 6 Drawing Sheets

(56) References Cited

U.S. PATENT DOCUMENTS

| | | | |
|---|---|---|---|
| 6,183,527 B1* | 2/2001 | O'Banion | B23D 59/006 |
| | | | 55/439 |
| D525,000 S * | 7/2006 | Williams | D32/15 |
| 8,973,196 B2* | 3/2015 | Tomasiak | A47L 7/0038 |
| | | | 15/3 |
| 9,572,465 B2* | 2/2017 | Tomasiak | A47L 7/0019 |
| 2009/0178233 A1 | 7/2009 | Yoo | |
| 2010/0154367 A1* | 6/2010 | Luo | A47L 5/362 |
| | | | 55/456 |

OTHER PUBLICATIONS

Written Opinion in corresponding PCT/EP2017/058693, dated Jan. 9, 2018.
"Ultimate Dust Deputy Kit" by "Oneida air Systems" https://www.oneida-air.com/ultimate-dust-deputy-cyclone-kit-fesetool-vacs, downloaded Aug. 16, 2019.

* cited by examiner

CYCLONE PRE-SEPARATOR AND ARRANGEMENT

The invention relates to a cyclone pre-separator for positioning on a particle collecting container, the cyclone pre-separator comprising a housing and a cyclone unit arranged in the housing, the cyclone unit having an air inlet, an air outlet and a particle outlet arranged on an underside of the cyclone pre-separator, wherein the housing has an air inlet hose port connected to the air inlet and an air outlet hose port connected to the air outlet, and has lower housing couplers, adapted to provide, in a state, in which the cyclone pre-separator is positioned on the particle collecting container, a releasable, vertically tension-proof coupling to the particle collecting container.

BACKGROUND OF THE INVENTION

A cyclone pre-separator is typically connected upstream of a suction device, so that the airflow sucked in by the suction device first flows through the cyclone pre-separator and then the suction device. This allows a majority of the particles contained in the airflow to be removed already in the cyclone pre-separator, so that fewer particles are transported to the suction device. This is a particular advantage if the suction device has a bag and/or filter, by which particles are separated and which has to be changed when a particular fill level/degree of soiling is reached. Because a majority of the particles have already been removed from the airflow by the cyclone pre-separator, filling/soiling of the bag/filter is slower, meaning less frequent changes or longer usage of the bag/filter.

Cyclone pre-separators are in particular used in the manual crafts sector, where they are connected upstream of the bag suction devices commonly used there, to achieve the abovementioned advantage of longer usability of the bag.

By way of example, the company "Oneida AirSystems" offers a cyclone pre-separator under the product name "Ultimate Dust Deputy", which can be connected upstream of a bag suction device common in the manual crafts sector. This cyclone pre-separator has an air inlet hose port, an air outlet hose port and a particle outlet. The cyclone pre-separator has a conical basic shape and can be positioned via screw connections on a cover of a particle collecting container.

SUMMARY OF THE INVENTION

An object of the invention is to modify the abovementioned cyclone pre-separator in such a way that it is easier to handle. The object is achieved by adapting the housing of the cyclone pre-separator to be box-shaped.

Since the housing of the cyclone pre-separator is box-shaped, the cyclone pre-separator is easier to handle. This applies in particular in the manual crafts sector, where tools and other necessary items are often stored in system boxes, which can be stacked on top of each other and in this way can be easily transported and stowed. Due to its box shape, it is possible to stack system boxes on the cyclone pre-separator according to the invention, making the cyclone pre-separator according to the invention easier to stow and easier to transport.

The term "box-shaped" in particular means a substantially cuboid design. Further, "box-shaped" means a shape where the upper side is adapted so that a further box-shaped or cuboid body, in particular a system box, can be stacked on the upper side. By way of example, "box-shaped" means a shape where the upper side and peripheral walls are aligned orthogonally to each other.

The expression "releasable coupling" in particular means a coupling that can be established and released without tools and reversibly, by way of example a coupling involving a manually operable rotary latch or a manually operable locking lug. The expression "vertically tension-proof coupling" is intended in particular to mean a coupling which transmits forces vertically, and which expediently remains stable in the presence of the vertical forces acting during use or transport of the cyclone pre-separator. In the context of the cyclone pre-separator and the particle collecting container "vertically tension-proof coupling" is intended in particular to mean a coupling which, by lifting of the cyclone pre-separator, allows a particle collecting container coupled in a vertically tension-proof manner to be lifted together with the cyclone pre-separator. Expediently a "vertically tension-proof coupling" is a coupling, which in a plurality of, preferably in all, spatial directions is tension-proof or force-transmitting in a stable manner.

Expediently the cyclone pre-separator is a purely passive device. In particular, the cyclone pre-separator does not require a current supply to separate particles. Preferably the cyclone pre-separator does not have its own suction device.

Advantageous embodiments are the subject matter of the dependent claims.

Preferably the housing has upper housing couplers, which in particular comprise a movably mounted locking element. The upper housing couplers are expediently adapted to provide a releasable, vertically tension-proof coupling for the box-shaped body, when the box-shaped body is stacked on the housing. This allows a system box stacked on the housing to be coupled in a vertically tension-proof manner to the housing, so that together the system box and the housing form a stack which can be stably transported and stowed.

Preferably the housing has a removable and/or pivotable cover, which in an open position allows access to the cyclone unit. Thus, the cyclone unit is easily accessible and can be quickly and easily maintained or cleaned.

The upper housing couplers preferably comprise a rotary latch, arranged on the cover. Expediently the rotary latch is designed both for locking the cover and to provide the coupling with the box-shaped body. Thus, preferably only a single movably mounted locking element is necessary to both lock the cover and also provide the coupling with the box-shaped body.

Preferably the lower housing couplers comprise at least one movably mounted locking element. Expediently the lower housing couplers are arranged on longitudinal sides of the housing. Since the lower housing couplers of the cyclone pre-separator have a movably mounted locking element, no movably mounted locking element has to be provided on the particle collecting container to provide the coupling. Thus, the cyclone pre-separator can also be used together with a very simple and cheap to manufacture particle collecting container. By arranging the housing couplers on the longitudinal sides of the housing the advantage may be achieved that on the transverse sides of the particle collecting container no couplers need to be provided, so that instead carrying handles may be arranged there and ease of handling of the particle collecting container may be ensured.

Preferably the air inlet hose port and the air outlet hose port are arranged on one of the peripheral walls, in particular on a face side, of the housing. Since the hose ports are arranged on the same side, the necessary hoses can be quickly and simply connected.

Preferably the cyclone pre-separator has a socket. Expediently the housing has a socket recess to accept a socket insert. Thus, the cyclone pre-separator can offer the user the possibility of connecting an electrically operated device, by way of example a power tool, to the cyclone pre-separator for power supply.

Preferably on the underside of the cyclone pre-separator a groove is provided. Expediently the groove runs along the outer edge of the underside and is in particular adapted to accept the upper edge of the particle collecting container. In this way a particularly stable and expediently also airtight coupling between the cyclone pre-separator and the particle collecting container can be achieved.

Preferably the cyclone pre-separator has a bow-shaped carrying handle, arranged on the upper side of the housing. The carrying handle allows the cyclone pre-separator to be comfortably carried like a system box.

The invention further relates to an arrangement of a particle collecting container and a cyclone pre-separator positioned on the particle collecting container according to one of the embodiments discussed above. Expediently the particle collecting container has a horizontal cross-section tapering towards its container bottom, so that the particle collecting container can be stacked in an identical particle collecting container. The container bottom is in particular adapted so that the arrangement can be placed with the container bottom stably on a flat support. Such a combination of a box-shaped cyclone pre-separator and an inter-stacking particle collecting container is particularly easy to handle—the cyclone pre-separator can be transported and stowed practically in a stack of system boxes and the particle collecting container can be transported and stowed in a space-saving manner in a stack of identical particle collecting containers, which are stacked inside one another.

The arrangement also has a suction device, which on its upper side has a container receptacle with a horizontal cross-section tapering towards the receptacle bottom. Expediently the particle collecting container is inserted in the container receptacle and the air outlet hose port is connected via a hose with a hose port of the suction device. Thus, the cyclone pre-separator and the particle collecting container can be arranged on the suction device and can be transported together with the suction device in a practical way.

Expediently the arrangement has a/the suction device and a power tool. Expediently the cyclone pre-separator has a socket. The power tool is connected to the socket and the socket is connected via a connecting cable to the suction device. Preferably the suction device is adapted to detect that the power tool has been switched on and, in response thereto, to start sucking. Consequently, for a power tool connected to the cyclone pre-separator, suction can be automatically triggered by operating the power tool.

The invention also relates to an arrangement of an adapter frame and a cyclone pre-separator according to one of the embodiments discussed above, the cyclone pre-separator being positioned on the adapter frame. The adapter frame expediently has a container receptacle with a horizontal cross-section tapering towards the receptacle bottom. The adapter frame in particular also has upper adapter frame couplers, providing a releasable, vertically tension-proof coupling for the cyclone pre-separator. Expediently the upper adapter frame couplers provide the releasable, vertically tension-proof coupling to the lower housing couplers, in particular to the same lower housing couplers, to which the coupling of the particle collecting container can also be provided. The adapter frame also preferably has lower adapter frame couplers, adapted to provide a releasable, vertically tension-proof coupling for a body when the adapter frame is arranged on the body, in particular a suction device. Such an arrangement of adapter frame and cyclone pre-separator can in particular be stably arranged on a suction device for transport and together with the suction device form a stable vertical stack. Due to the couplers provided, such an arrangement of adapter frame and cyclone pre-separator can be adapted to couple both upwards and downwards to a system box. In particular the arrangement of adapter frame and cyclone pre-separator can thus in its entirety be handled like a system box and stably stowed in a vertical stack of system boxes.

The invention also relates to an arrangement comprising a cyclone pre-separator according to one of the abovementioned embodiments, and at least one box-shaped body, which is arranged on the cyclone pre-separator. Expediently the box-shaped body together with the cyclone pre-separator forms a vertical, preferably substantially cuboid stack. Expediently the box-shaped body has body couplers, which interact with the upper housing couplers, to create a releasable, vertically tension-proof coupling between the box-shaped body and the cyclone pre-separator.

Preferably the box-shaped body has a suction device and a hose port. Consequently both the cyclone pre-separator and a suction device can be accommodated in the same cuboid stack.

BRIEF DESCRIPTION OF THE DRAWINGS

Exemplary embodiments are described below by reference to the drawing.

DETAILED DESCRIPTION OF THE INVENTION

Figure 1:
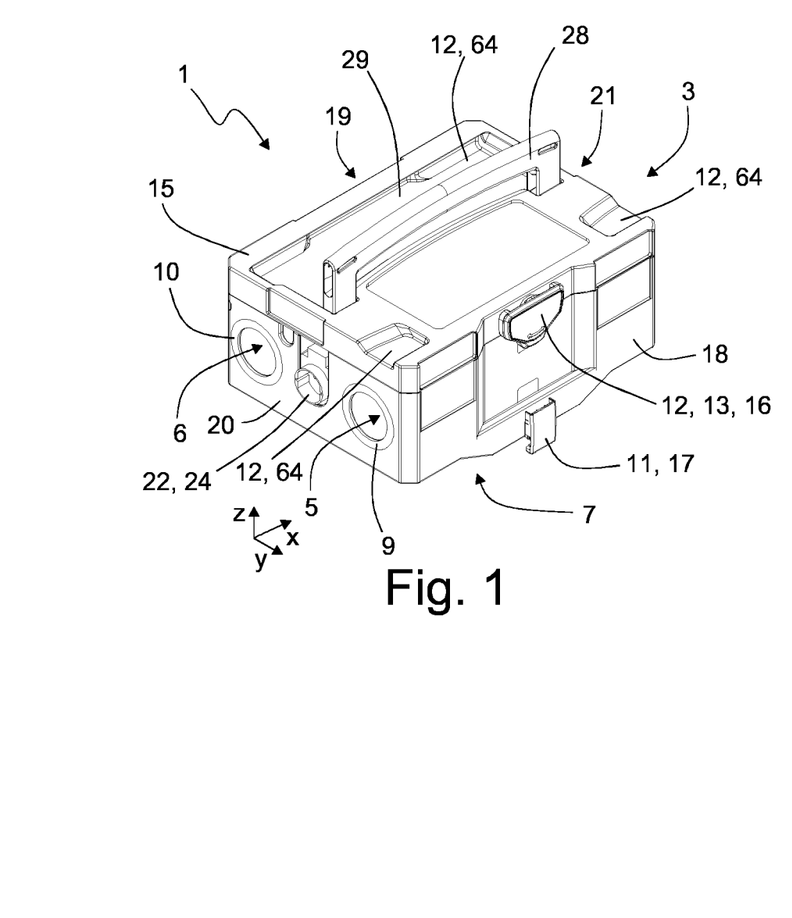
FIG. 1 shows a perspective view of a cyclone pre-separator from above.

As shown in FIG. 1, the cyclone pre-separator 1 extends in a vertical direction, running parallel to the shown z-axis, in a longitudinal direction, running parallel to the shown x-axis, and in a transverse direction, running parallel to the shown y-axis. The x-axis, y-axis and z-axis are aligned orthogonally to each other.

The cyclone pre-separator 1 is adapted to be positioned on a particle collecting container 2. The particle collecting container 2 is, by way of example, shown in FIG. 5. The cyclone pre-separator 1 comprises a box-shaped housing 3 and a cyclone unit 4 arranged in the housing 3. The cyclone unit 4 can be seen in FIG. 3. The cyclone unit 4 has an air inlet 5, an air outlet 6 and a particle outlet 8 arranged on a underside 7 of the cyclone pre-separator 1, shown in FIG. 2. The housing 3 has an air inlet hose port 9 connected to the air inlet 5 and an air outlet hose port 10 connected to the outlet 6. The housing 3 also has lower housing couplers 11, adapted to provide, in a state in which the cyclone pre-separator 1 is positioned on the particle collecting container 2, a releasable, vertically tension-proof coupling to the particle collecting container 2.

Due to its box-shaped adaptation, the cyclone pre-separator can be accommodated and transported in a stack of further box-shaped bodies, such as system boxes.

In the following, exemplary configurations of the individual components of the cyclone pre-separator 1 and exemplary arrangements 30, 40, 50, comprising the cyclone pre-separator 1, and the components thereof are discussed.

As shown in FIG. 1, the cyclone pre-separator 1 has a cuboid basic shape. The height of the cyclone pre-separator 1 is exemplarily less than its width and less than its length. Expediently the width of the cyclone pre-separator 1 is less than its length. By way of example, the cyclone pre-separator 1 is between 390 mm and 400 mm, in particular 396 mm, long and between 290 mm and 300 mm, in particular 296 mm, wide. Preferably the height of the cyclone pre-separator 1 with folded carrying handle 28 is less than 200 mm.

The housing 3 of the cyclone pre-separator 1 has four peripheral walls 18, 19, 20, 21 aligned orthogonally to each other. The peripheral walls 18 and 19 represent longitudinal sides aligned parallel to the longitudinal direction x and the peripheral walls 20 and 21 represent transverse sides aligned parallel to the transverse direction y. The transverse sides are also referred to as face sides.

The housing 3 has upper housing couplers 12, comprising a movably mounted locking element 13. The upper housing couplers 12 are adapted to provide, in a state in which a box-shaped body 14 is stacked on the housing 3, a releasable, vertically tension-proof coupling to the box-shaped body 14. Such a state, in which a box-shaped body 14 is stacked on the housing 3, is for example shown in FIG. 11. Preferably the upper housing couplers 12 are suitable for providing a coupling that is tension-proof in a plurality of, in particular all, spatial directions.

The movably mounted locking element 13 is exemplarily designed as a rotary latch 16. Expediently the locking element 13 is arranged on the longitudinal side 18. Alternatively to the design shown as a rotary latch 16, the locking element 13 can also be designed as a locking lug, supported so that it can swivel and/or slide. The swivel axis can in this case expediently run parallel to the peripheral wall of the cyclone pre-separator 1, on which the locking lug is arranged. The sliding axis for a sliding support can expediently run in the vertical direction.

Exemplarily the upper housing couplers 12 also have engagement structures 64, suitable for engaging with corresponding engagement structures such as feet of a system box. The engagement structures 64 are provided on the upper side 29. The engagement structures 64 are expediently static structures —i.e. non-movable structures. Expediently the engagement structures 64 are designed to contribute to a vertical and/or horizontal coupling. By way of example, the engagement structures 64 can have rear grip components for this.

In the example shown, the engagement structures 64 comprise a plurality of engagement recesses arranged on the upper side 29, in particular two first engagement recesses arranged in the vicinity of the front longitudinal side 18 and a second engagement recess arranged in the vicinity of the rear longitudinal side 19. The engagement recesses 64 are adapted such that they can receive engagement projections, preferably feet of a system box.

The cyclone pre-separator 1, in particular in terms of its cuboid basic shape, its upper housing couplers 12 and the design of its upper side 29, resembles a system box. System boxes of a system have a base area defined in the system and have couplers defined in the system or are compatible with a particular coupling system, so that system boxes of a system can be combined to form a stable stack. System boxes are, by way of example, widely used as modular toolboxes for the storage of manually-operated power tools, accessories and/or consumables. Since at least the cuboid basic shape, the upper housing couplers 12 and the upper side 29 of the cyclone pre-separator 1 are designed as in a system box, the cyclone pre-separator 1 can form the bottom-most stacking element of a stack of system boxes and in this way be efficiently stowed and transported.

As already mentioned above, the housing 3 also has lower housing couplers 11. Exemplarily the lower housing couplers 11 comprise two movably mounted locking elements 17 and are provided on longitudinal sides of the housing 3. Expediently the locking elements 17 are arranged on the longitudinal sides centrally in the longitudinal direction. The locking elements 17 are in particular designed as locking lugs, mounted so that they can swivel and/or slide. The swivel axis can expediently run parallel to the peripheral wall 18, 19 of the cyclone pre-separator 1 on which the locking lug is arranged. The sliding axis for a slidable support can expediently run in the vertical direction. Alternatively to the shown design as locking lugs, one or both locking elements 17 can also be designed as a rotary latch. It is also possible for the lower housing couplers 11 to have just one movably mounted locking element 17. In this case the lower housing couplers 11 can, by way of example, in addition to the movably mounted locking element have a non-movable engagement structure.

As already mentioned above, the housing 3 has an air inlet hose port 9 and an air outlet hose port 10. As shown in FIG. 1, the two hose ports 9, 10 are arranged on a face side of the housing 3, and expediently distributed in the transverse direction. Exemplarily the two hose ports 9, 10 have a circular design.

Figure 2:
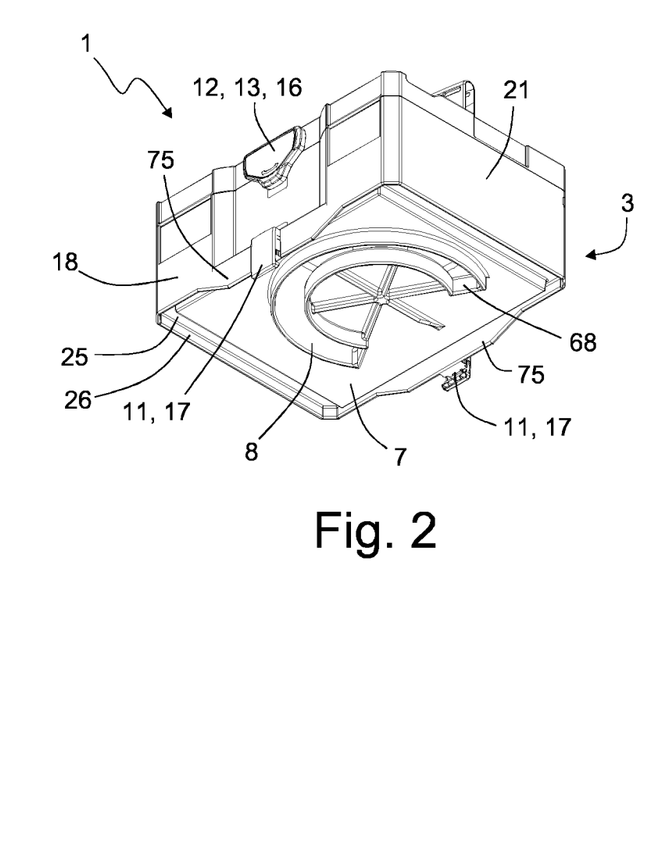
FIG. 2 shows a perspective view of the cyclone pre-separator from below.

FIG. 2 shows the underside 7 of the cyclone pre-separator 1. On the underside 7 the particle outlet 8 is arranged, which exemplarily has an annular gap or annular section gap design. Expediently the particle outlet 8 is surrounded by an edge 68 protruding vertically downwards.

Figure 5:
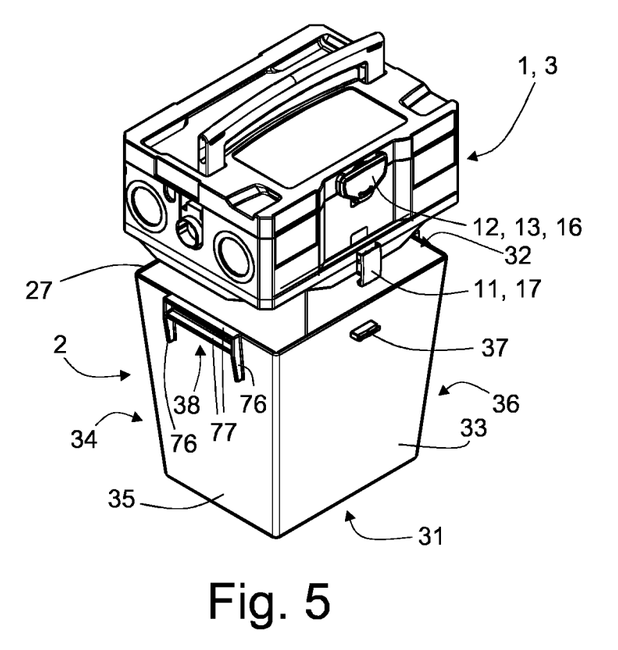
FIG. 5 shows the cyclone pre-separator over a particle collecting container.

On the underside 7 a groove 25 is provided, running along the outer edge 26 of the underside 7 and adapted to receive the upper edge 27 of the particle collecting container 7 shown by way of example in FIG. 5. The groove 25 completely surrounds the particle outlet 8 and has an overall rectangular course. In the groove 25 a surrounding flexible seal can expediently be provided. The outer edge 26 of the underside is exemplarily formed by the lower edge of the peripheral walls 18, 19, 20, 21.

The peripheral walls 18 and 19—thus the front longitudinal side and the rear longitudinal side—each comprise exemplarily a wall section 75, protruding downwards beyond the other edge 26, the wall section 75 being arranged centrally in the longitudinal direction. The transitions from the other outer edge 26 to the wall sections 75 protruding downwards are respectively chamfered. The lower housing couplers 11 are exemplarily arranged on the wall sections 75 protruding downwards. Alternatively to the embodiment shown with the protruding wall sections 75, the housing 3 can also be designed without the wall sections 75. The housing couplers 11 can then, by way of example, be arranged in the lower region of the peripheral walls 18, 19.

Figure 3:
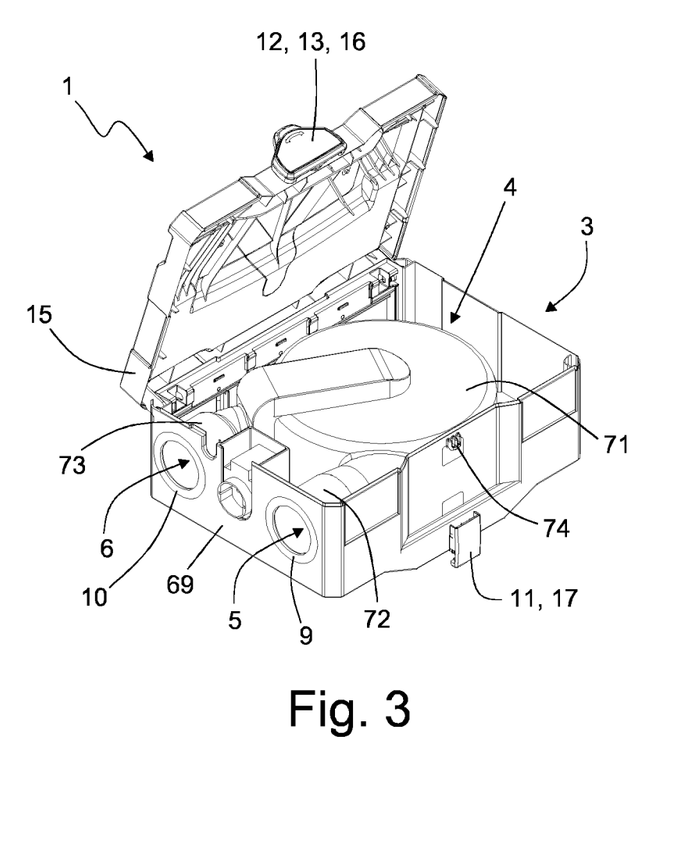
FIG. 3 shows a perspective view of the cyclone pre-separator with the cover open.

The housing 3 of the cyclone pre-separator 1 comprises a cover 15 and a bottom section 69, which each have the same horizontal cross-section, so that the cover 15 extends over the entire base area of the bottom section 69. The cover 15 is hinged in the region of the rear longitudinal side 19 to the bottom section 69 so that it can pivot. FIG. 3 shows the cyclone pre-separator 1 with an open cover 15. In the open position the pivotable cover 15 provides access to the cyclone unit 4.

The cyclone unit 4 comprises an air inlet pipe 72, an inlet cylinder 71 and an air outlet pipe 73. The air inlet pipe 72 provides the air inlet 5 and the air outlet pipe 73 provides the air outlet 6. The air inlet pipe 72 and the air outlet pipe 73 are exemplarily arranged next to each other and run at least in sections parallel to each other. The air inlet pipe 72 provides a fluidic connection between the air inlet hose port 9 and the inlet cylinder 71. The air outlet pipe 73 provides a fluidic connection between the inlet cylinder 71 and the air outlet hose port 10. The cyclone unit 4 is adapted to make use of the known operating principle of a cyclone separator or of a centrifugal separator. When there is a negative pressure at the air outlet 6 an airflow is sucked through the air inlet 5, passes through the inlet cylinder 71 and is output via the air outlet 6. The inlet cylinder 71 is adapted such that the airflow is directed on a circular path, wherein particles contained in the airflow are hurled against the walls of the inlet cylinder 71 by the centrifugal force, so that they are slowed down and finally output from the particle outlet 8.

The inlet cylinder 71 is aligned with its cylinder axis exemplarily parallel to the vertical direction. Expediently the height of the inlet cylinder 71 is less than its diameter. The air inlet pipe 72 exemplarily opens into the cylinder jacket of the inlet cylinder 71. The air outlet pipe 73 runs expediently at least partially across the upper base area of the inlet cylinder 71 and opens into a central region there in the upper base area.

The rotary latch 16 already mentioned above is arranged on the cover 15. The rotary latch 16 is adapted to lock the cover 15 as well as to provide the coupling to a box-shaped body 14 arranged on the cyclone pre-separator 1. The rotary latch 16 has in particular a T-shaped form and can expediently be shifted into at least three different positions: FIG. 3 shows a first position of the rotary latch 16, in which the rotary latch 16 is not in coupling engagement with a locking projection 74 arranged below the rotary latch 16 on the bottom section 69. In this position the cover 15 can be opened. In this position also a coupling to a box-shaped body 14 positioned on the cyclone pre-separator 1 can be provided. FIG. 1 shows a second position of the rotary latch 16, in which the rotary latch 16 is in coupling engagement with the locking projection 74, but is unable to provide a coupling to the box-shaped body 14 positioned on the cyclone pre-separator 1. In a third position, not shown in the figures, the rotary latch 16 can be brought into coupling engagement simultaneously with the locking projection 74 and a put on box-shaped body 14.

A carrying handle 28 is provided on the cover 15. In the example shown, the carrying handle 28 is arranged on the upper side 29 of the cover 15. The carrying handle 28 is advantageously adapted such that it can selectively adopt a non-use position, in which it is swivelled onto the upper side 29 of the cover 15, or a use position, in which it is swivelled upwards and thus protrudes upwards beyond the upper side 29. The carrying handle 28 preferably has a U-shaped design.

Figure 4:
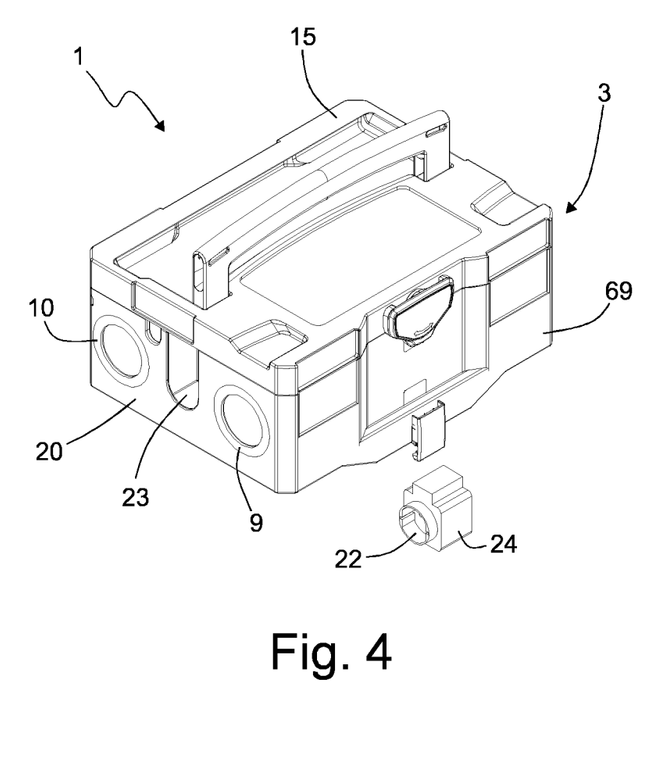
FIG. 4 shows the cyclone pre-separator with the socket insert removed.

The housing 3 has a socket recess 23 to receive a socket insert 24. In FIG. 4 the socket insert 24 is shown in the removed state. In the other illustrations of the cyclone pre-separator 1, the socket insert 24 is inserted in the recess 23. The socket insert 24 has a socket 22 and a connecting cable 48 with a mains plug shown in FIG. 7. The socket recess 23 is exemplarily arranged on the same front as the two hose ports 9, 10. Expediently the socket recess 23 is arranged between the two hose ports 9, 10. Exemplarily the socket recess 23 is provided in the bottom section 69 and adapted to be upwardly open, so that the socket recess 23 can be upwardly closed by the cover 15. The socket recess 23 and the socket insert 24 are preferably adapted such that the socket insert 24 can be inserted, in particular plugged, into the socket recess 23 in a fixed manner, so that the socket insert 24 at least when the cover 15 is closed remains in the socket recess 23.

FIG. 5 shows the cyclone pre-separator 1 together with a particle collecting container 2, on which the cyclone pre-separator 1 can be placed. The particle collecting container 2 serves to catch and collect the particles output from the particle outlet 8.

Figure 6:
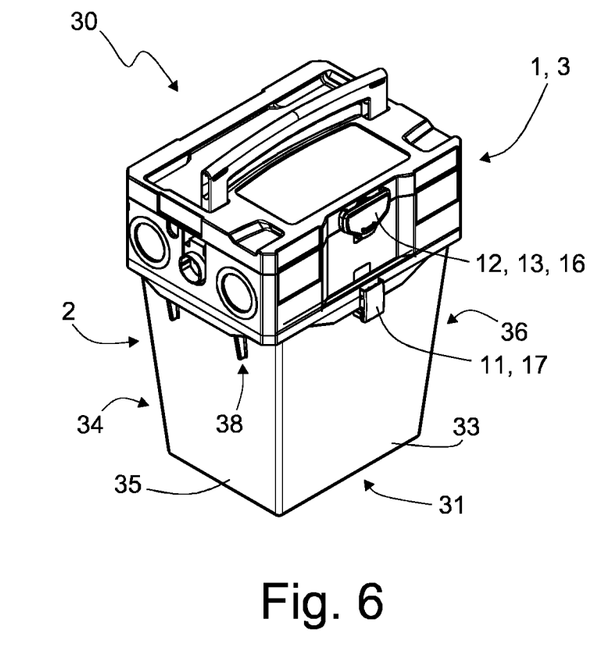
FIG. 6 shows an arrangement with the cyclone pre-separator and the particle collecting container.

FIG. 6 shows the cyclone pre-separator 1 positioned on the particle collecting container 2 and connected in a vertically tension-proof manner by means of the lower housing couplers 11 to the particle collecting container 2. The cyclone pre-separator 1 is positioned with its underside 7 or the groove 25 arranged on the underside 7 on the particle collecting container 2.

The dimension of the particle collecting container 2 in the vertical direction is greater than the dimension of the cyclone pre-separator 1 in the vertical direction. Preferably the particle collecting container 2 is double the height or more than double the height of the cyclone pre-separator 1. The particle collecting container 2 has an open upper side 32. The dimension of the open upper side 32 is, in the longitudinal direction and in transverse direction respectively, less than the corresponding dimension of the underside 7 of the cyclone pre-separator 1.

The particle collecting container 2 has an exemplarily rectangularly shaped container bottom 31 and container peripheral walls 33, 34, 35, 36 extending upwards from the container bottom 31. The upper side 32 of the particle collecting container 2 is completely open; i.e. the upper side 32 is formed by the upper edge 27 of the container peripheral walls 33, 34, 35, 36. The height of the particle collecting container 2 is exemplarily greater than its length and greater than its width. Expediently the width of the particle collecting container 2 is less than its length.

The particle collecting container 2 has a horizontal cross-section tapering towards the container bottom 31. In particular, the horizontal cross-section has a continuous taper. The shape of the particle collecting container 2 corresponds expediently to an inverted truncated pyramid with a rectangular base area. The design with the downwardly-tapering horizontal cross-section will also be referred to here as "conical". Due to this conical design of the particle collecting container 2 a plurality of particle collecting containers 2 can be stacked inside one another and in this way are particularly easily stowable and transportable. A particle collecting container 2 designed in this way can be produced by injection moulding.

The particle collecting container 2, and in particular the container bottom 31, is adapted such that the particle collecting container 2 can be placed with the container bottom 31 stably on a flat support, in particular also when the cyclone pre-separator 1 is positioned on the particle collecting container 2.

The particle collecting container 32 has container handles 38, arranged on the container peripheral walls 35, 36 aligned parallel to the transverse direction. The container handles 38 are arranged in the region of the upper side 32. Exemplarily the container handles 38 are flush with the upper side 32. The container handles 38 ensure that the particle collecting container 32 can be properly grasped and carried. Furthermore, the container handles 38 are designed as spacers, which when two or more particle collecting containers 2 are stacked inside one another create a greater vertical distance between the respective upper sides 32, so that the particle collecting containers 2 stacked into one another can be removed or separated from one another without great physical effort. Exemplarily the container handles 38 each have two vertical bars 76, between which two horizontal bars 77 spaced apart from each other are arranged. The upper horizontal bar 77 is flush with the upper side 32 of the particle collecting container 2.

The particle collecting container 2 further has container couplers 37. The container couplers 37 are adapted to provide a releasable, vertically tension-proof coupling between the particle collecting container 2 and the cyclone pre-separator 1, by interacting with the lower housing couplers 11. Exemplarily the container couplers 37 are arranged on the peripheral sides 33, 34 of the particle collecting container 2 aligned parallel to the longitudinal direction. The container couplers 37 are expediently bar-shaped protrusions. The container couplers 37 are preferably aligned with their longitudinal axis parallel to the longitudinal direction and are, in the longitudinal direction, in particular centrally arranged on the peripheral sides 33, 34. The container couplers 37 are expediently located in the region of the upper side 32 of the particle collecting container 2.

Figure 7:
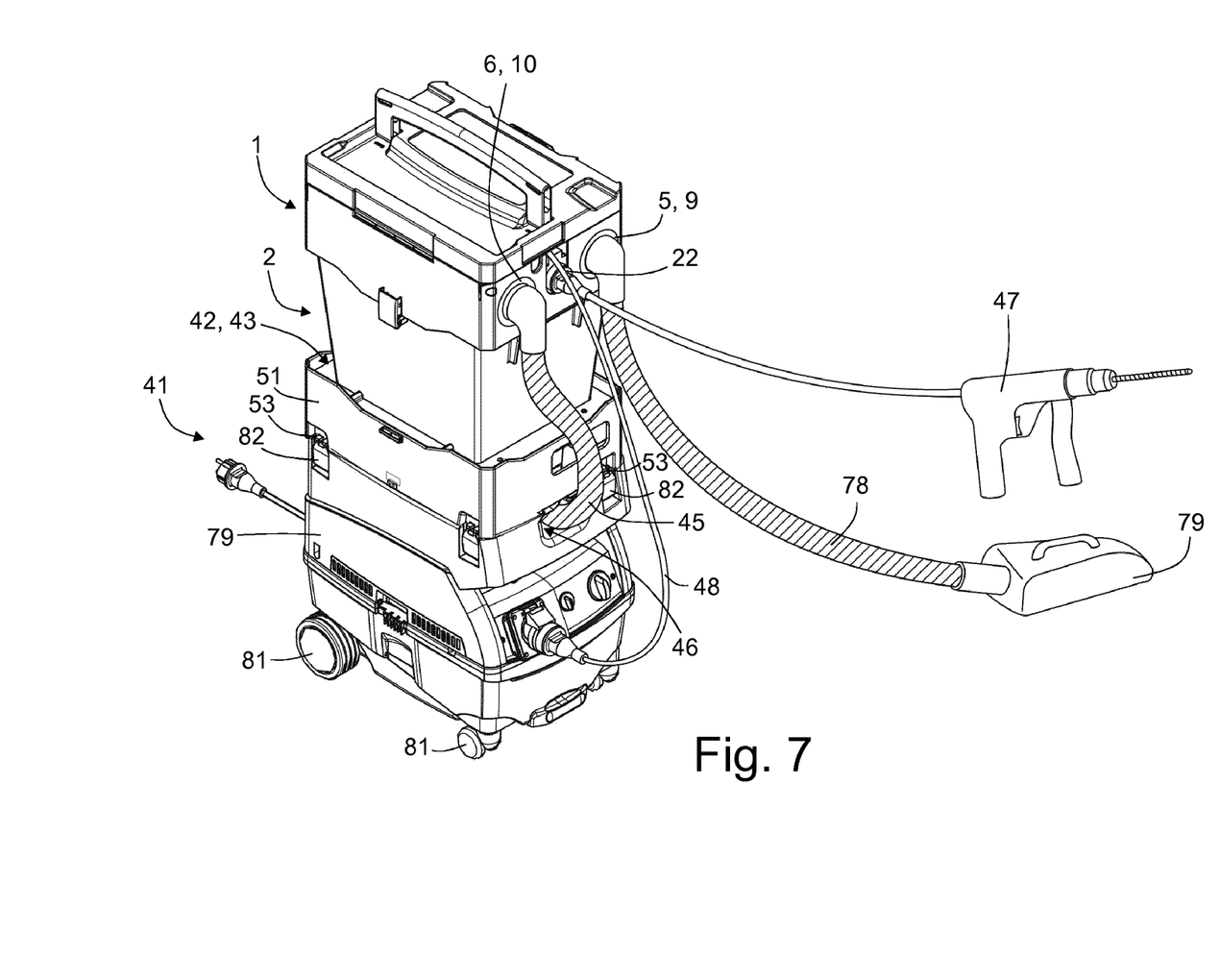
FIG. 7 shows an arrangement with the cyclone pre-separator, the particle collecting container and a suction device.

FIG. 7 shows an arrangement 40 of the cyclone pre-separator 1, particle collecting container 2 and a suction device 41. The cyclone pre-separator 1 is positioned on the particle collecting container 2 and, by means of the housing couplers 11 and the container couplers 37, is coupled in a vertically tension-proof manner to the particle collecting container 2. The particle collecting container 2 is in turn inserted in a container receptacle 43, provided on the upper side 42 of the suction device 41. The suction device 41 has a suction port 46 and is configured to provide a negative pressure at this suction port 46. The suction port 46 is connected via a hose 45 with the air outlet hose port 10. A suction hose 78 with a suction head 79 is connected to the air inlet hose port 9. The suction device 41 is expediently a bag suction device and/or a filter suction device.

If the suction device 41 is switched on and starts to suck, then via the suction head 79 and the suction hose 78 an airflow is sucked into the cyclone pre-separator 1. There, a part of the particles present in the airflow is separated and transported to the particle collecting container 2. The airflow is output through the air outlet 6 and via the hose 45 and the suction port 46 reaches the suction device 41. There, the airflow passes, by way of example, through a bag and/or a filter, where the particles still contained in the airflow at this point are separated. Due to the fact that a part of the particles has already been separated in the cyclone pre-separator 1, fewer particles reach the bag or filter, so that the bag or filter has to be changed less frequently.

The suction device 41 comprises a suction device 79 and an adapter frame 51 positioned on the suction device 79. The container receptacle 43 is provided in the adapter frame 51. Alternatively to the design shown, in which the container receptacle 43 is provided in the adapter frame 51, the container receptacle 43 can also be integrated into the suction device 79. In this case the adapter frame 51 is not required.

The suction device 79 is exemplarily designed as a mobile suction device and has drive wheels 81, by which the suction device 79 is movable. The suction device 79 has suction device couplers 82, coupled to the lower adapter frame couplers 53. Exemplarily the suction device couplers 82 are movably mounted locking luges and the lower adapter frame couplers 53 are locking projections.

Figure 9:
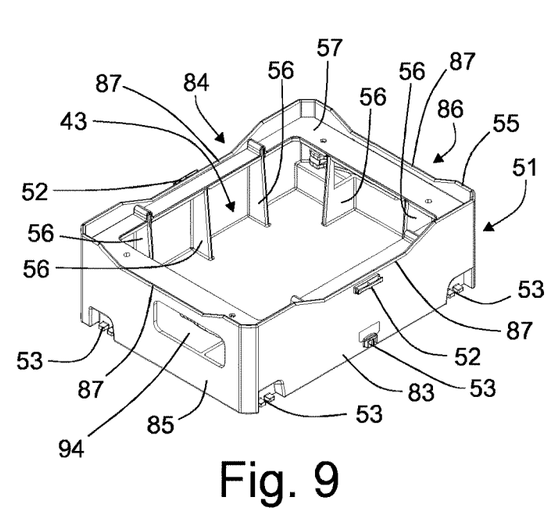
FIG. 9 shows a perspective view of the adapter frame from above.
Figure 10:
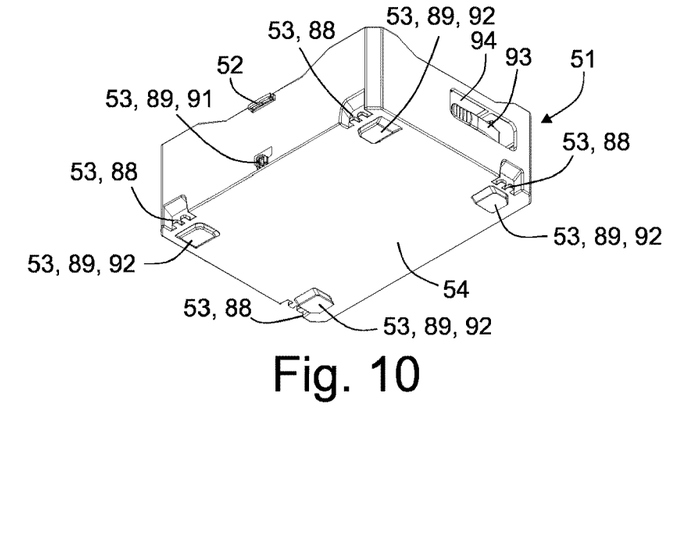
FIG. 10 shows a perspective view of the adapter frame from below.

As explained in further detail and shown in FIGS. 9 and 10, the lower adapter frame couplers 53 exemplarily comprise first lower adapter frame couplers 88 and second lower adapter frame couplers 89. In the exemplary embodiment of FIG. 7 the adapter frame 51 with the first lower adapter frame couplers 88 is coupled to the suction device 79. Alternatively, the coupling can also take place via the second lower adapter frame couplers 89. In the latter case the suction device 79 can be designed such that it comprises corresponding couplers that are compatible with the second lower adapter frame couplers 89. By way of example, the suction device 79 can comprise couplers designed in accordance with the upper housing couplers 12 and for example comprise a movably mounted locking element, in particular a rotary latch, and engagement recesses.

The container receptacle 43 is conically designed to correspond with the particle collecting container 2; this means that the horizontal cross-section of the container receptacle 43 tapers towards the receptacle bottom 44. The container receptacle 43 surrounds the particle collecting container 2 peripherally, so that the particle collecting container 2 is held stably in the container receptacle 43. The container receptacle 43 (in the vertical direction) is in particular less than half as deep, preferably less than a third as deep, as the particle collecting container 2 is high.

The arrangement 40 shown in FIG. 7 also comprises an electrical device 47, by way of example a power tool, connected to the socket 22 of the cyclone pre-separator 1. The socket 22 is in turn connected via the connecting cable 48 to the suction device 79. The suction device 79 is configured to detect that the power tool 47 has been switched on, and, in response thereto, to start sucking.

Figure 8:
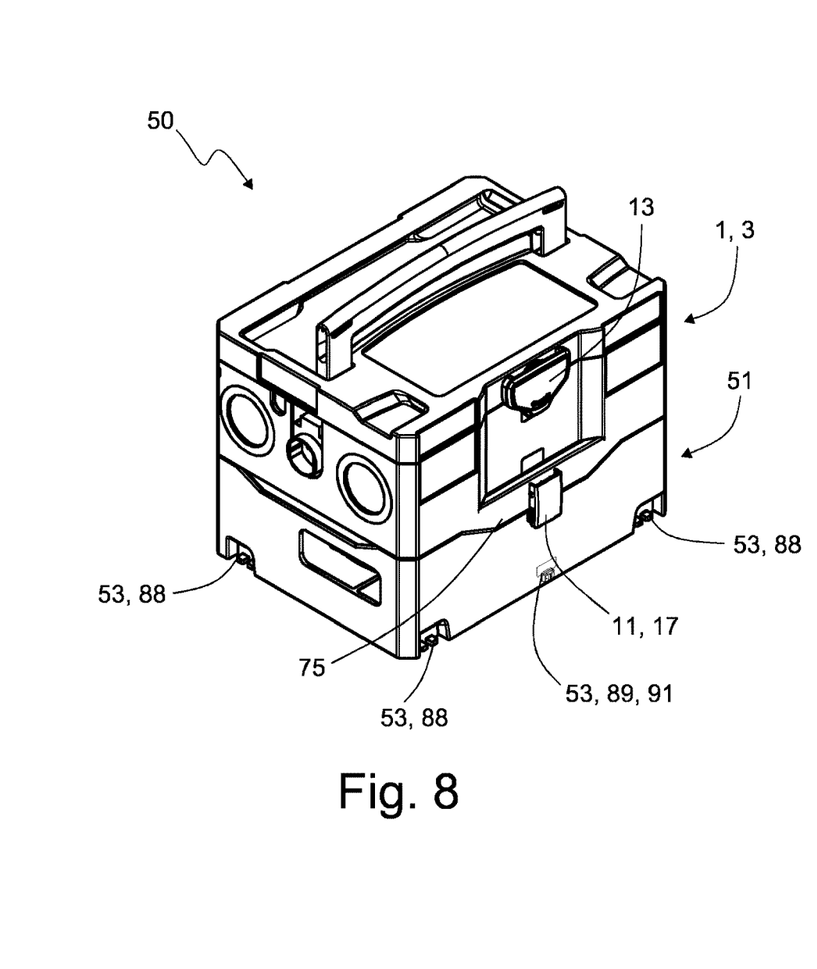
FIG. 8 shows an arrangement with the cyclone pre-separator and an adapter frame.

FIG. 8 shows an arrangement 50 of the cyclone pre-separator 1 and the adapter frame 51. FIGS. 9 and 10 show the adapter frame 51 on its own. As already mentioned above, the adapter frame 51 has the container receptacle 43. The adapter frame 51 also has upper adapter frame couplers 52, which provide a releasable, vertically tension-proof coupling with the cyclone pre-separator 1, in particular with the lower housing couplers 11 of the cyclone pre-separator 1.

When the cyclone pre-separator 1 is positioned on the adapter frame 51 and coupled to the adapter frame 51, the cyclone pre-separator 1 and the adapter frame 51 can be transported and stowed together particularly easily. In particular, the arrangement 50 with the upper housing couplers 13 and the lower adapter frame couplers 53 has the upper and lower couplers of a system box and can therefore be handled like a system box and in particular transported and stowed in a stack of system boxes. Overall, the arrangement 50 has a box-shaped, in particular cuboid, form.

The upper housing couplers 13 and the lower adapter frame couplers 53 are in particular adapted such that together they represent the couplers of a system box, and thus in particular can be coupled to themselves. This means that the upper housing couplers 13 and the lower adapter frame couplers 53 are in particular adapted in such a way that a body equipped with the lower adapter frame couplers 53 can be stacked on a body equipped with the upper housing couplers 13 and can be coupled releasably in a vertically tension-proof manner to this body quipped with the upper housing couplers 13.

Alternatively or in addition to the embodiment described, in which the cyclone pre-separator 1, together with the adapter frame 3, forms a system box, the cyclone pre-separator 1 can also be adapted such that it can function as a system box on its own. In particular, the cyclone pre-separator 1 can be equipped with such lower housing couplers that the cyclone pre-separator can be stacked on an identical cyclone pre-separator and can be coupled releasably in a vertically tension-proof manner to this identical cyclone pre-separator.

FIG. 9 shows the adapter frame 51 from above. In FIG. 10 the adapter frame 51 is shown from below. The adapter frame 51 has a rectangular adapter frame bottom 54, from which four adapter frame peripheral walls 83, 84, 85, 86 extend upwards. The peripheral walls 83, 84 are longitudinal sides aligned parallel to the longitudinal direction and the peripheral walls 85, 86 are transverse sides aligned parallel to the transverse direction. On the inside of the adapter frame peripheral walls 83, 84, 85, 86 a plurality of vertical bars 56 are exemplarily arranged, which define the conical container receptacle 43. The bars 56 each have a trapezoidal design and are secured to an inside of the peripheral walls 83, 84, 85, 86 and to an inside of the adapter frame bottom 54. The inside edges of the bars facing inwards are angled with respect to the peripheral walls 55 or the adapter frame bottom 54, so that the horizontal distance between the inside edges and the peripheral walls increases continuously towards the adapter frame bottom 54.

In the upper region of the adapter frame 51 exemplarily a frame element 57 is arranged, which defines the upper border of the container receptacle 43. The frame element 57 is secured to the peripheral walls 83, 84, 85, 86 and horizontally aligned with its largest surface. The frame element 57 has a frame opening that constitutes the access to the container receptacle 43. The frame element 57 has a surrounding inside edge, which forms the upper border of the container receptacle 43. At the level at which the bars 56 touch the frame element 57, the bars 56 and the frame element 57 are adapted to be flush with each other in horizontal direction.

Alternatively or additionally to the embodiment shown, in which the container receptacle 43 is defined by bars 56 and the frame element 57, the container receptacle 43 can also be defined by one or more closed inside walls. By way of example, all inside walls of the container receptacle 43 can be closed.

As shown in FIG. 9, the peripheral walls 83, 84, 85, 86 protrude upwards beyond the frame element 57 or beyond the upper border of the container receptacle 43. The upper edges of the peripheral walls 83, 84, 85, 86 form an upper edge 55.

On each peripheral wall 83, 84, 85, 86 purely exemplarily a peripheral wall recess 87 is provided, which reduces the height of the upper edge of the respective peripheral wall 83, 84, 85, 86 relative to the other upper edge 55. The peripheral wall recesses 87 of the peripheral walls aligned parallel to the longitudinal direction are designed to correspond to the protruding wall sections 75 discussed above of the cyclone pre-separator 1, so that as can be seen in FIG. 8, the protruding wall sections 75 fit into these peripheral wall recesses 87.

Alternatively to this purely exemplary embodiment, the adapter frame 51 can also be designed without the peripheral wall recesses 87. In particular, the adapter frame 51 can also have an upper edge 55, which is designed to correspond to the upper edge 27 of the particle collecting container 2, so that it likewise can be inserted in the groove 25 of the cyclone pre-separator 1. Expediently the upper edge 55 of the adapter frame 51 has a planar design.

On the peripheral walls 83, 84 aligned parallel to the longitudinal direction the upper adapter frame couplers 52 are arranged. Expediently the adapter frame couplers 52 are bar-shaped projections. In particular, the adapter frame couplers 52 are aligned with their longitudinal axis parallel to the longitudinal direction and preferably arranged in the longitudinal direction centrally on the peripheral sides 83, 84. Expediently the adapter frame couplers 52 are located in the region of the upper edge 55 of the adapter frames 51.

In the exemplary embodiment of FIG. 8, the course of the upper edge 55 of the adapter frame 51 corresponds to the course of the outer edge 26 of the underside 7 of the cyclone pre-separator 1. For the cyclone pre-separator 1 shown positioned on the adapter frame 51, consequently the outer edge 26 of the underside 7 of the cyclone pre-separator 1 is arranged precisely above the upper edge 55 of the adapter frames 51 or is positioned on this.

Alternatively to this purely exemplary embodiment, the upper edge 55 of the adapter frame 51 can be inwardly displaced relative to the lower edge of the peripheral walls 83, 84, 85, 86 or the lower outer contour of the adapter frame 51, so that the upper edge 55 of the adapter frame 51 can be inserted in the groove 25 of the cyclone pre-separator 1.

As already mentioned above, the adapter frame 51 has lower adapter frame couplers 53. The lower adapter frame couplers 53 comprise exemplarily first lower adapter frame couplers 88 and second lower adapter frame couplers 89. The first lower adapter frame couplers 88 and the second lower adapter frame couplers 89 are each compatible with a different coupling system or system boxes. According to an alternative embodiment not shown in the figures, either the first lower adapter frame couplers 88 or the second lower adapter frame couplers 89 are not present.

The first lower adapter frame couplers 88 comprise a plurality of locking projections, arranged in the rear corner regions on both peripheral sides 85, 86 aligned parallel to the transverse direction, and in both corner regions of the peripheral side 83 aligned parallel to the longitudinal direction.

The second lower adapter frame couplers 89 comprise a locking projection 91, arranged in the longitudinal direction centrally on the front peripheral side 83. The second adapter frame couplers 89 exemplarily also comprise engagement projections 92 designed as feet 92, arranged in the corner areas of the underside of the adapter frame 51. The engagement projections 92 and the engagement recesses 64 described above of the cyclone pre-separator 1 are designed such that when an adapter frame 51 is stacked on the cyclone pre-separator 1, the engagement projections 92 are in locking engagement with engagement recesses 64. Further details of possible embodiments of such engagement projections and engagement recesses are by way of example described in EP2315701B1.

Purely exemplarily, the adapter frame 51 has operable clamping means 93, designed to clamp in the container receptacle 43 a particle collecting container 2 inserted in the container receptacle 43. The clamping means 93 can, by way of example, comprise one or more clamping levers. The clamping levers can, by way of example, be mounted about a vertical axis. Exemplarily the clamping means 93 are arranged on the peripheral sides 85, 86 aligned parallel to the transverse direction. As shown in FIGS. 9 and 10, exemplarily on each of the peripheral sides 85, 86 a window 94 is provided, in which a clamping means 83 is arranged.

Figure 11:
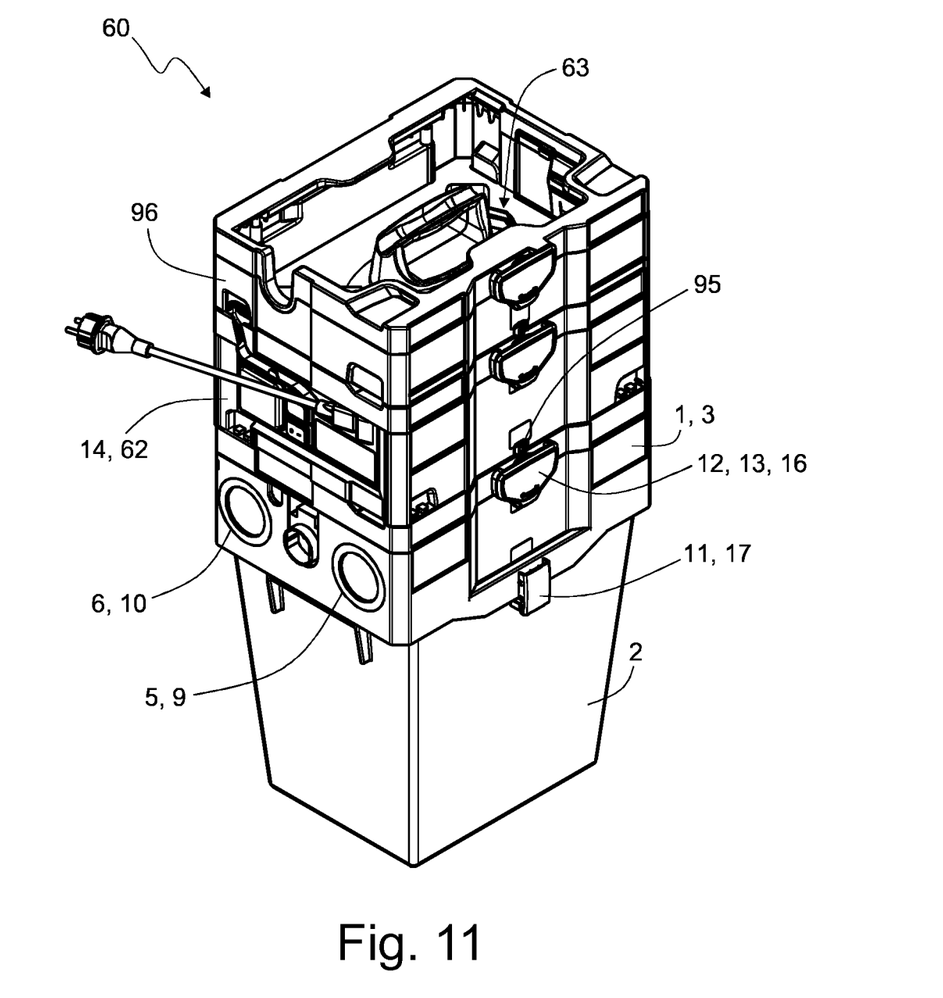
FIG. 11 shows an arrangement with a box-shaped body, the cyclone pre-separator and the particle collecting container.

FIG. 11 shows an arrangement 60, comprising the cyclone pre-separator 1 and a box-shaped body 14. The box-shaped body 14 is arranged on the cyclone pre-separator 1 and together with the cyclone pre-separator 1 forms a vertical, substantially cuboid stack. The box-shaped body 14 has lower body couplers 95, able to interact with the upper housing couplers 12, in order to provide a releasable, vertically tension-proof coupling between the box-shaped body 14 and the cyclone separator 1. Expediently the lower body couplers 95 have an identical design to the second lower adapter frame couplers 89 described above. In particular, the lower body couplers 95 comprise a locking projection and engagement projections.

The box-shaped body 14 is in particular a system box. Expediently the box-shaped body 14 has a suction unit 62 and a suction port 63. The suction unit 62 is expediently a bag and/or filter suction unit. The suction port 63 can be connected via a hose (not shown) with the air outlet hose port 10 of the cyclone pre-separator 1, so that by means of the suction unit 62 the negative pressure required for the operation of the cyclone pre-separator 1 can be provided. In the example shown a box-shaped hose storage facility 96 is also positioned on the box-shaped body 14.

The invention claimed is:

1. A cyclone pre-separator for positioning on a particle collecting container, the cyclone pre-separator comprising:
   a box-shaped housing having a substantially cuboid shape; and
   a cyclone unit arranged in the housing, the cyclone unit comprising an air inlet, an air outlet, and a particle outlet arranged on a underside of the cyclone pre-separator,
   wherein the housing has an air inlet hose port connected to the air inlet and an air outlet hose port connected to the air outlet, and has lower housing couplers, adapted to provide a releasable, vertically tension-proof coupling to the particle collecting container, when the cyclone pre-separator is positioned on the particle collecting container,
   wherein the cyclone unit comprises an inlet cylinder arranged within the box-shaped housing, an air inlet pipe and an air outlet pipe arranged in the box-shaped housing,
   wherein the air inlet pipe provides the air inlet and provides a fluidic connection between the air inlet hose port and the inlet cylinder, and wherein the air outlet pipe provides the air outlet and provides a fluidic connection between the inlet cylinder and the air outlet hose port,
   wherein the air inlet pipe and the air outlet pipe are arranged completely in the box-shaped-housing, and
   wherein gaps or spaces are provided between the box-shaped housing and the cyclone unit within the box-shaped housing.

2. The cyclone pre-separator of claim 1, wherein the box-shaped housing has four peripheral walls aligned orthogonally to each other.

3. The cyclone pre-separator of claim 2, wherein the air inlet hose port and the air outlet hose port are arranged on the same peripheral wall of the box-shaped housing.

4. The cyclone pre-separator of claim 3, wherein the air inlet hose port and the air outlet hose port are openings within the same peripheral wall of the box-shaped housing.

5. The cyclone pre-separator according to claim 1, wherein the housing has upper housing couplers, which are adapted to provide, in a state, in which a box-shaped body is stacked on the housing, a releasable, vertically tension-proof coupling to the box-shaped body.

6. The cyclone pre-separator according to claim 5, wherein the air inlet hose port and the air outlet hose port are arranged on one of the peripheral sides of the housing.

7. The cyclone pre-separator according to claim 5, wherein the cyclone pre-separator comprises a socket and/or the housing comprises a socket recess to accept a socket insert.

8. The cyclone pre-separator according to claim 5, wherein on the underside of the cyclone pre-separator a groove is provided, which runs along the outer edge of the underside and is adapted to receive the upper edge of the particle collecting container.

9. The cyclone pre-separator according to claim 5, further comprising a bow-shaped carrying handle, arranged on the upper side of the housing.

10. The cyclone pre-separator according to claim 5, wherein the upper housing couplers comprise a movably mounted locking element.

11. The cyclone pre-separator according to claim 5, wherein the lower housing couplers comprise at least one movably mounted locking element.

12. The cyclone pre-separator according to claim 11, wherein the lower housing couplers are provided on longitudinal sides of the housing.

13. The cyclone pre-separator according to claim 5, wherein the housing has a removable and/or pivotable cover, which in an open position allows access to the cyclone unit.

14. The cyclone pre-separator of claim 13, wherein the cover forms the entire upper side of the box-shaped housing.

15. The cyclone pre-separator according to claim 13, wherein the upper housing couplers comprise a rotary latch, arranged on the cover and adapted both for locking the cover and for providing the coupling to the box-shaped body.

16. The cyclone pre-separator of claim 15, wherein the rotary latch has a T-shaped form.

17. The cyclone pre-separator of claim 15, wherein the rotary latch can be rotated in at least three different positions.

18. A cyclone pre-separator for positioning on a particle collecting container, the cyclone pre-separator comprising:
   a box-shaped housing having a polygonal shape; and
   a cyclone unit arranged in the housing, the cyclone unit comprising an air inlet, an air outlet, and a particle outlet arranged on a underside of the cyclone pre-separator, wherein the housing has an air inlet hose port connected to the air inlet and an air outlet hose port connected to the air outlet, and has lower housing couplers, adapted to provide a releasable, vertically tension-proof coupling to the particle collecting container, when the cyclone pre-separator is positioned on the particle collecting container, wherein the cyclone unit comprises an inlet cylinder arranged within the box-shaped housing, an air inlet pipe and an air outlet pipe arranged in the box-shaped housing, wherein the air inlet pipe provides the air inlet and provides a fluidic connection between the air inlet hose port and the inlet cylinder, and wherein the air outlet pipe provides the air outlet and provides a fluidic connection between the inlet cylinder and the air outlet hose port, wherein the air inlet pipe and the air outlet pipe are arranged completely in the box-shaped-housing, and wherein gaps or spaces are provided between the box-shaped housing and the cyclone unit within the box-shaped housing.

\* \* \* \* \*